United States Patent
Morgan

(10) Patent No.: US 12,535,028 B2
(45) Date of Patent: Jan. 27, 2026

(54) SYSTEM FOR VACUUM-FILLING A HEAT EXCHANGER WITH FLUID AND METHOD OF USING

(71) Applicant: Joshua Morgan, Stillwater, MN (US)

(72) Inventor: Joshua Morgan, Stillwater, MN (US)

(73) Assignee: Joshua Morgan, Stillwater, MN (US)

( * ) Notice: Subject to any disclaimer, the term of this patent is extended or adjusted under 35 U.S.C. 154(b) by 0 days.

(21) Appl. No.: 18/924,752

(22) Filed: Oct. 23, 2024

(65) Prior Publication Data
US 2025/0129736 A1 Apr. 24, 2025

Related U.S. Application Data

(60) Provisional application No. 63/592,436, filed on Oct. 23, 2023.

(51) Int. Cl.
| | |
|---|---|
| *F01P 11/02* | (2006.01) |
| *B60S 5/00* | (2006.01) |
| *B67D 7/02* | (2010.01) |
| *B67D 7/72* | (2010.01) |

(52) U.S. Cl.
CPC ........ *F01P 11/0204* (2013.01); *B67D 7/0277* (2013.01); *B67D 7/725* (2013.01); *B60S 5/00* (2013.01)

(58) Field of Classification Search
CPC ...... F01P 11/0204; F01P 11/0276; B60S 5/00; F01M 11/0458
See application file for complete search history.

(56) References Cited

U.S. PATENT DOCUMENTS

| | | | | | |
|---|---|---|---|---|---|
| 5,056,621 | A | * | 10/1991 | Trevino | F01M 11/0458 123/196 R |
| 5,069,062 | A | * | 12/1991 | Malecek | G01M 3/3227 73/49.7 |
| 12,360,001 | B2 | * | 7/2025 | Gabbey | B60S 5/00 |
| 2001/0010237 | A1 | * | 8/2001 | Klamm | F01P 11/0204 141/1 |
| 2006/0042721 | A1 | * | 3/2006 | Flynn | F01P 11/0204 141/98 |

(Continued)

OTHER PUBLICATIONS

Screengrab from www.skf.com; Mityvac Fluid Evacuators; URL: <https://web.archive.org/web/20200813004424/https://www.skf.com/mityvac/products/fluid-evacuation-and-dispensing-equipment-and-accessories/fluid-evacuators> [retrieved from Aug. 13, 2020].

*Primary Examiner* — Timothy P. Kelly
(74) *Attorney, Agent, or Firm* — Faegre Drinker Biddle & Reath LLP

(57) ABSTRACT

A system for vacuum filling a cooling assembly is provided. The system comprising a manifold comprising a first aperture, a second aperture, and a third aperture. Further, an eductor fluidly coupled to the first aperture, a first valve fluidly coupled between the eductor and the first aperture, and an expansion reservoir sealingly coupled to the second aperture. An end unit is fluidly coupled to the third aperture, the end unit comprising a conduit fluidly coupled with the third aperture, a second valve fluidly coupled to the conduit, a cap for sealingly coupling with a supply volume, and a pipe coupled to the cap and fluidly coupled with the conduit, the pipe sealingly coupled to the cap and extending outwardly from the cap.

15 Claims, 20 Drawing Sheets

(56) References Cited

U.S. PATENT DOCUMENTS

| | | | |
|---|---|---|---|
| 2012/0318404 A1* | 12/2012 | Ehlers | F01P 11/0276 |
| | | | 141/8 |
| 2013/0213523 A1* | 8/2013 | Allen | F01P 11/0204 |
| | | | 137/861 |
| 2013/0287593 A1* | 10/2013 | Erwin | F01M 11/045 |
| | | | 417/63 |
| 2025/0187900 A1* | 6/2025 | Morgan | B67D 7/725 |

* cited by examiner

Fig. 1 - Prior Art

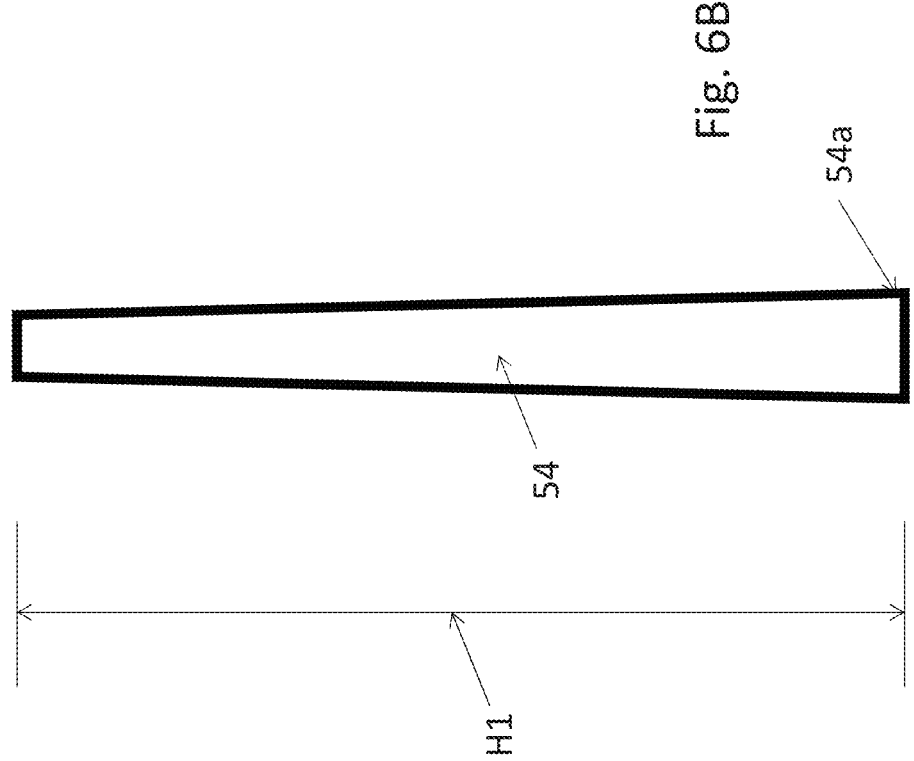
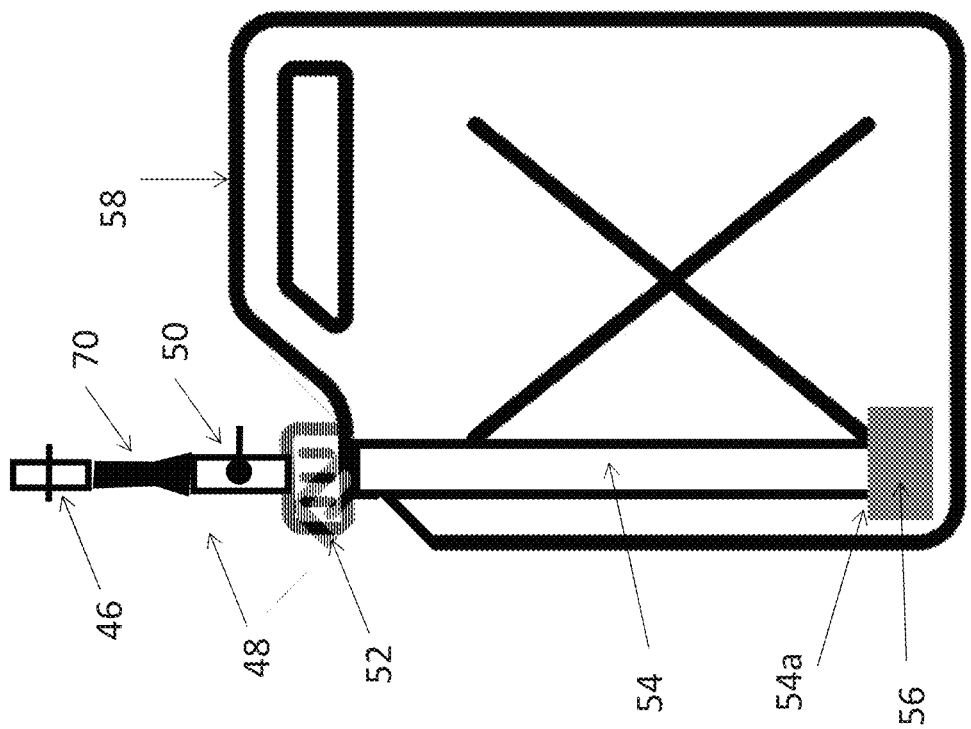

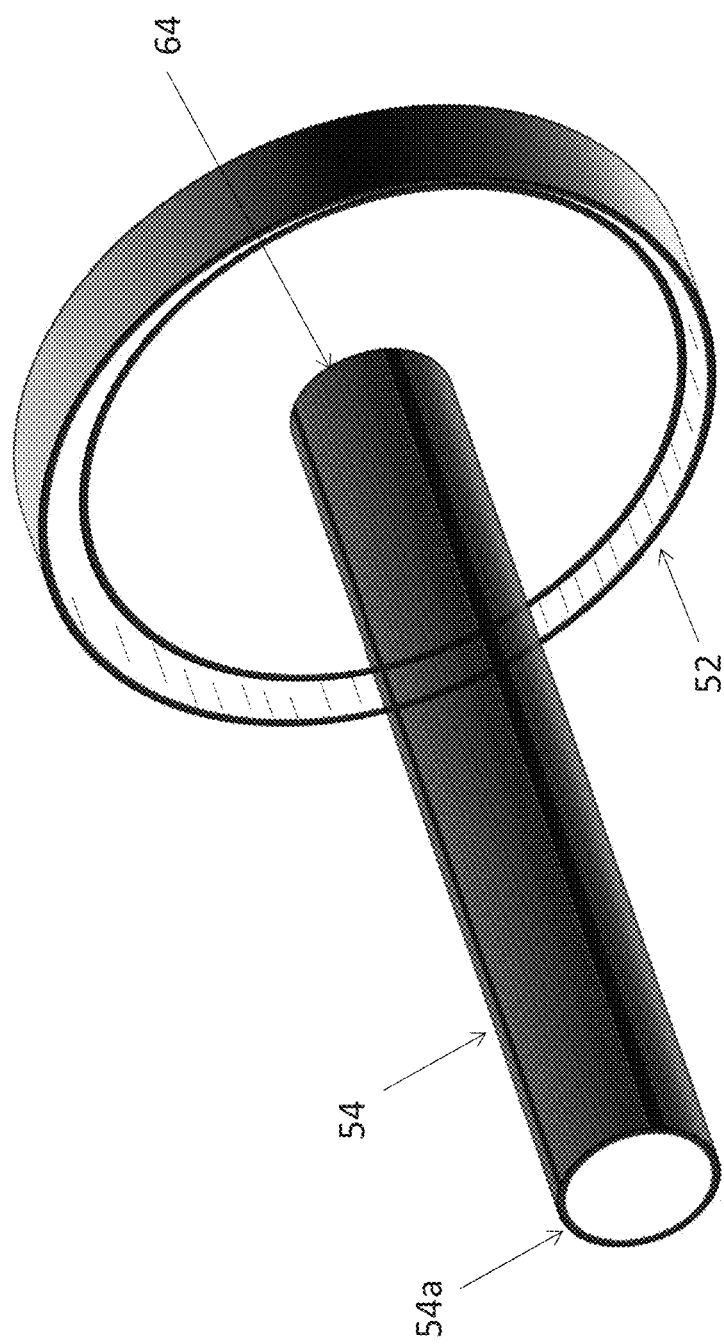

10, 14, 24, 40, 46

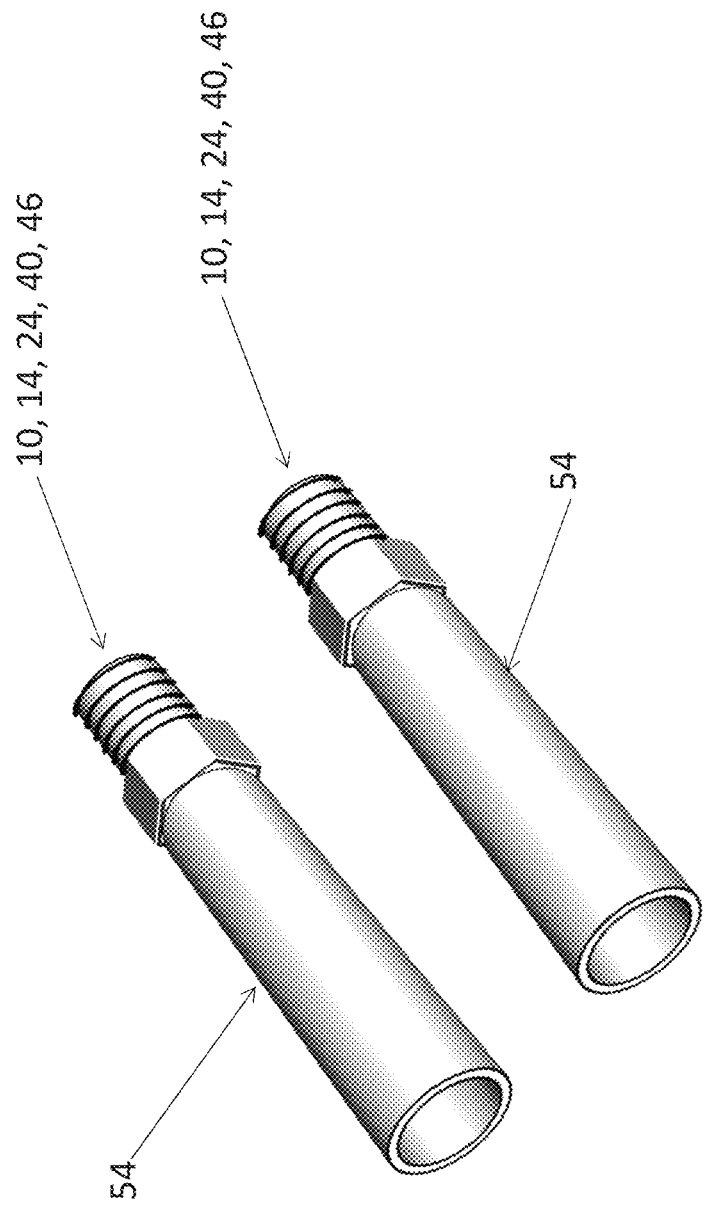

ial Patent Application No. 63/592,436 filed Oct. 23, 2023, entitled APPARATUS FOR VACUUM-FILLING A HEAT EXCHANGER WITH FLUID AND METHOD OF USING, the contents of which are expressly incorporated by reference herein.

TECHNICAL FIELD

The present invention relates to fluid fill systems. In particular, the present invention relates to an assembly for vacuum-filling a heat exchanger of a cooling assembly with fluid.

BACKGROUND

In automotive service centers, refilling coolant is a standard practice. Due to the high passthrough of cars through these centers, particularly in urban areas or busy commercial districts, this practice is done with high frequency, dozens of times daily. However, regularly pouring coolant directly into reservoir tanks can cause a lack of precision, consistency, and risk contamination. As such, following the performance of maintenance on an internal combustion engine's cooling system of, one method of refilling the system with coolant involves drawing a vacuum on the system and then allowing coolant to be sucked into the liquid cooling system through a suction tube having an inlet that is positioned near the bottom of a supply reservoir. This involves the manipulation of valves by a technician while simultaneously holding the suction tube in the supply reservoir, maintaining the inlet to the suction tube below the level of the coolant in the supply reservoir, and maintaining the supply reservoir upright. This operation is typically a one-person task, requiring the technician to manipulate the valves with one hand while positioning the suction tube with the other hand. If the inlet to the suction tube is not continuously maintained below the level of the coolant in the supply reservoir, the vacuum in the coolant system can be broken, requiring the process to be repeated. Moreover, the supply reservoir is prone to tipping over, allowing the coolant to spill from it. In some situations, the supply reservoir is positioned within or near the vehicle's engine cavity, thereby increasing the likelihood of a spill occurring.

Despite the wide use of the aforementioned method in the internal combustion maintenance industry, there exists an unfulfilled need for a device that aids a technician in vacuum-filling a coolant system by positioning the inlet to a suction tube below the level of the coolant in the supply reservoir while also preventing coolant from spilling from the supply reservoir if it is inadvertently tipped sideways.

SUMMARY

According to one embodiment of the present disclosure, a device adapted for vacuum-filling a coolant system.

According to another embodiment of the present disclosure, a method of using a device adapted for vacuum-filling a coolant system.

In an embodiment of the present disclosure, a system for vacuum filling a cooling assembly is provided. The system comprises a manifold comprising a first aperture, a second aperture, and a third aperture. The system further comprises an eductor fluidly coupled to the first aperture and a first valve fluidly coupled between the eductor and the first aperture. An expansion reservoir is sealingly coupled to the second aperture and an end unit is fluidly coupled to the third aperture. The end unit comprises a conduit fluidly coupled with the third aperture, a second valve fluidly coupled to the conduit, a cap for sealingly coupling with a supply volume, and a pipe coupled to the cap and fluidly coupled with the conduit, the pipe sealingly coupled to the cap and extending outwardly from the cap.

In embodiments, the end unit further comprises a strainer coupled to the pipe, wherein the pipe is coupled to the cap at a pipe first end and the strainer is coupled to the pipe at a pipe second end.

In embodiments, the strainer includes a first portion and a second portion, and the first portion defines a plurality of channels.

In embodiments, the second portion is threadedly engaged with the pipe second end.

In embodiments, the third valve is fluidly coupled to the conduit, the third valve is positioned fluidly intermediate the end unit and the manifold.

In embodiments, a pressure gauge is coupled to the manifold.

In embodiments, the system further comprises a plurality of quick connectors, and the plurality of quick connectors includes a first quick connector coupled between the end unit and the third valve.

In yet another embodiment of the present disclosure, a method of vacuum filling a cooling assembly with a system is provided. The system comprising a manifold comprising a first aperture, a second aperture, and a third aperture. The system further comprising an end unit fluidly coupled to the third aperture, a first valve fluidly coupled with the first aperture, a second valve fluidly coupled between the third aperture and the end unit. The end unit comprises a third valve. The method further comprises coupling the first aperture to a compressed air supply, fluidly coupling the second aperture to a cooling assembly, and sealingly coupling the end unit to a coolant supply. Further, the method comprises opening the first valve to allow an air stream from the compressed air supply to flow through an air eductor, the pressure on the cooling assembly decreasing in response to the air flow flowing through the air eductor. The method comprises closing the first valve subsequent to the pressure on the cooling assembly reaching a first predetermined threshold, and opening each of the second valve and the third valve to allow coolant from the coolant supply to flow into the cooling assembly.

In embodiments, the end unit includes a pipe operable to extend to a position adjacent a bottom surface of the coolant supply.

In embodiments, a strainer is coupled to the bottom of the pipe.

In embodiments, the first predetermined threshold is 30 inches of Mercury.

In embodiments, the system further comprising a plurality of quick connectors, the plurality of quick connectors including a first quick connector coupled between the end unit and the second valve.

In embodiments, the plurality of quick connectors includes a second quick connector coupled between the first aperture and the air eductor.

In embodiments, the system further comprising an expansion reservoir fluidly coupled with the second aperture.

In embodiments, the expansion reservoir is fluidly coupled between the second aperture and the cooling assembly.

BRIEF DESCRIPTION OF THE DRAWINGS

The accompanying drawings, which are incorporated in and constitute a part of this specification, together with a general description of the invention given above, and the detailed description of the embodiments below, serve to explain the principles of the invention.

FIG. 6A shows the standpipe assembly removed from the supply reservoir shown in FIG. 4, having an outer diameter (OD) and an inner diameter (ID).

FIG. 6B shows the rigid pipe of the standpipe assembly shown in FIG. 6A.

FIG. 7A shows an underside view of the cap and standpipe assembly shown in FIG. 4.

FIG. 7H shows two exemplary push-to-connect quick connect fittings of different sizes, each connected to a respective standpipe.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
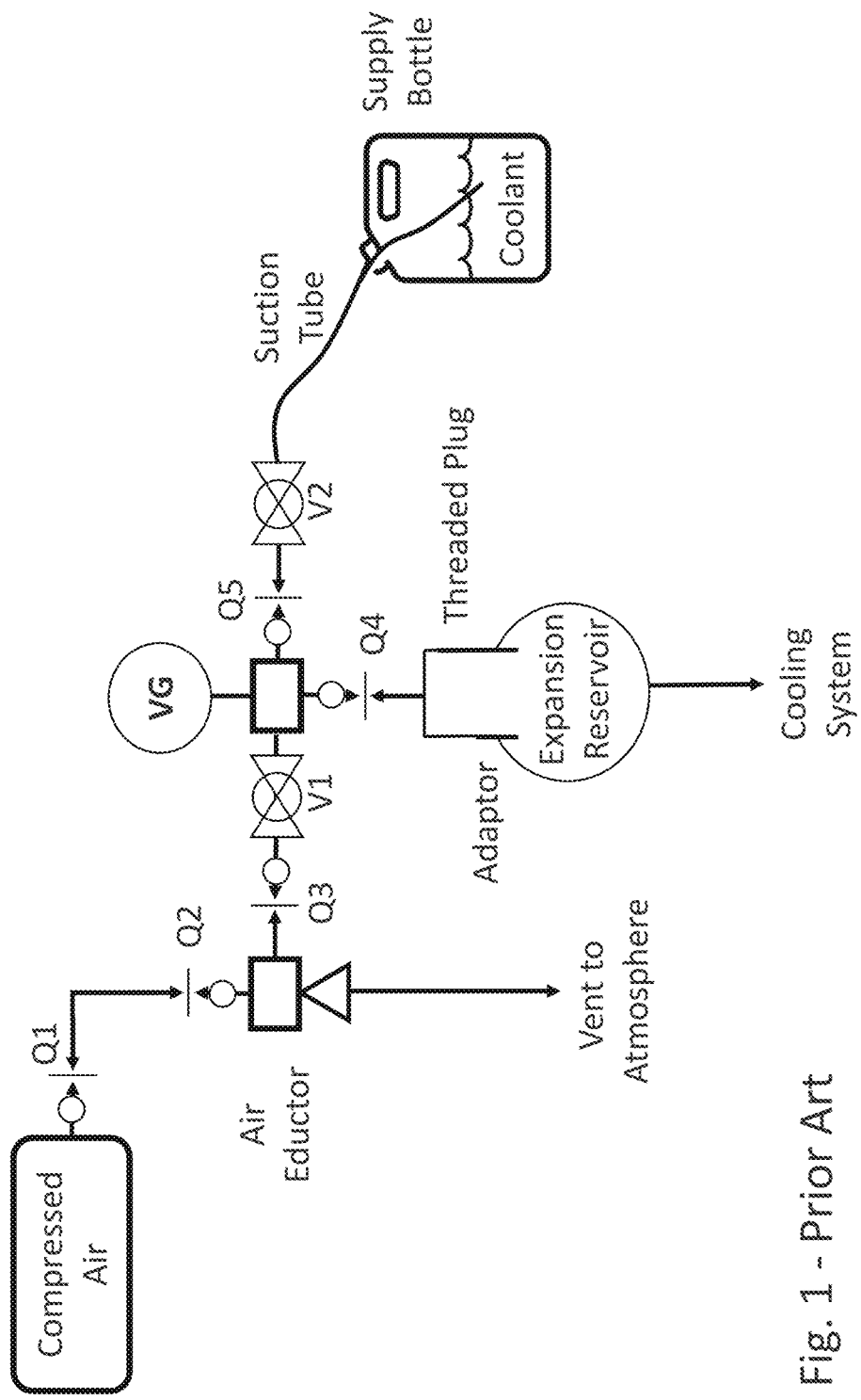
FIG. 1 is a schematic diagram showing an apparatus of the prior art for vacuum-filling a coolant system.

FIG. 1 is a schematic diagram showing an assembly of the prior art for vacuum-filling a coolant system. Shown in FIG. 1 are a coolant vacuum fill apparatus, a compressed air supply, a fitting Q1 attaching the compressed air supply to an air hose, a fitting Q2 attaching the air hose to an air eductor, a vent hose for venting discharge air from the air eductor to the atmosphere. A fitting Q3 attaches the vacuum port on the air eductor to a valve V1 attached to a manifold, a vacuum gauge VG is coupled to the manifold, a fitting Q4 attaches a vacuum hose to a threaded adaptor of an expansion reservoir on a cooling system of an internal combustion engine. A fitting Q5 attaches the manifold to a valve V2, and a suction tube may be placed through an opening of a supply bottle partially filled with coolant. Valves V1 and V2 are both 90 deg (quarter-turn) ball valves that are used to seal the system after a vacuum is drawn on the coolant system. In other embodiments, an alternative ball valve may be used without impacting the performance of the system (i.e., a threaded ball valve), In other embodiments, an alternative valve method may be used without impacting the performance of the system (i.e., a needle valve). In other embodiments, the ball valve and the cap may be manufactured as one connected piece. In other embodiments, the cap may be manufactured such that it may receive a generic threaded valve of the correct diameters. Vacuum gauge VG is calibrated to indicate a vacuum that ranges from zero (atmospheric pressure) to 30 inches Hg (hard vacuum). Manifold is a four-port manifold configured so that Vacuum gauge VG, valve V1, fitting Q4, and fitting Q5 are attached to its respective ports. Valve V2 is also used to create a flow path between the coolant in the supply bottle via the suction tube to the threaded plug adapter attached to the expansion reservoir and into the expansion reservoir.

The coolant system vacuum fill assembly shown in FIG. 1 is used to refill the cooling system on an internal combustion engine with coolant following maintenance on the cooling system that had been at least partially drained of coolant prior to or during the maintenance. During operation of this coolant system vacuum fill assembly, an internal combustion engine technician (hereafter, technician) connects the assembly as shown in FIG. 1. Valves V1 and V2 are closed. The flow of compressed air from the compressed air supply is initiated to air eductor, and the technician opens valve V1, thereby allowing a vacuum to be drawn on cooling system. Shop compressed air is typically about 180 psi but can range from about 100-400 psi. The technician monitors the vacuum on the cooling system by observing vacuum gauge VG, continuing until the vacuum level reaches the desired level. Typically, nearly a full vacuum (hard vacuum) is drawn, having an indication of about 30 inches of Mercury (inches Hg or 762 mm Hg) on vacuum gauge VG. Next, the technician closes valve V1 and then discontinues supplying compressed air to air eductor. With the desired vacuum having been established on the cooling system, the technician holds suction tube in supply bottle so that the suction tube end is submerged in coolant in supply bottle. The technician must use care to maintain suction tube end submerged in coolant to avoid breaking the vacuum during the filling operation. The technician must also use care to prevent tipping supply bottle, which could allow coolant to drain from it through its open mouth. Finally, the technician opens valve V2, allowing coolant to be sucked through suction tube via manifold into expansion reservoir until coolant system has been refilled as indicated by a desired level of coolant in expansion reservoir. The technician then closes valve V2, breaks vacuum by opening valve V1, and removes coolant system vacuum fill assembly.

As noted above, if supply bottle is not held upright and suction tube is not held submerged in coolant, vacuum in coolant system can be inadvertently broken. In this case, the technician must reperform the above steps to properly refill coolant system.

Figure 2:
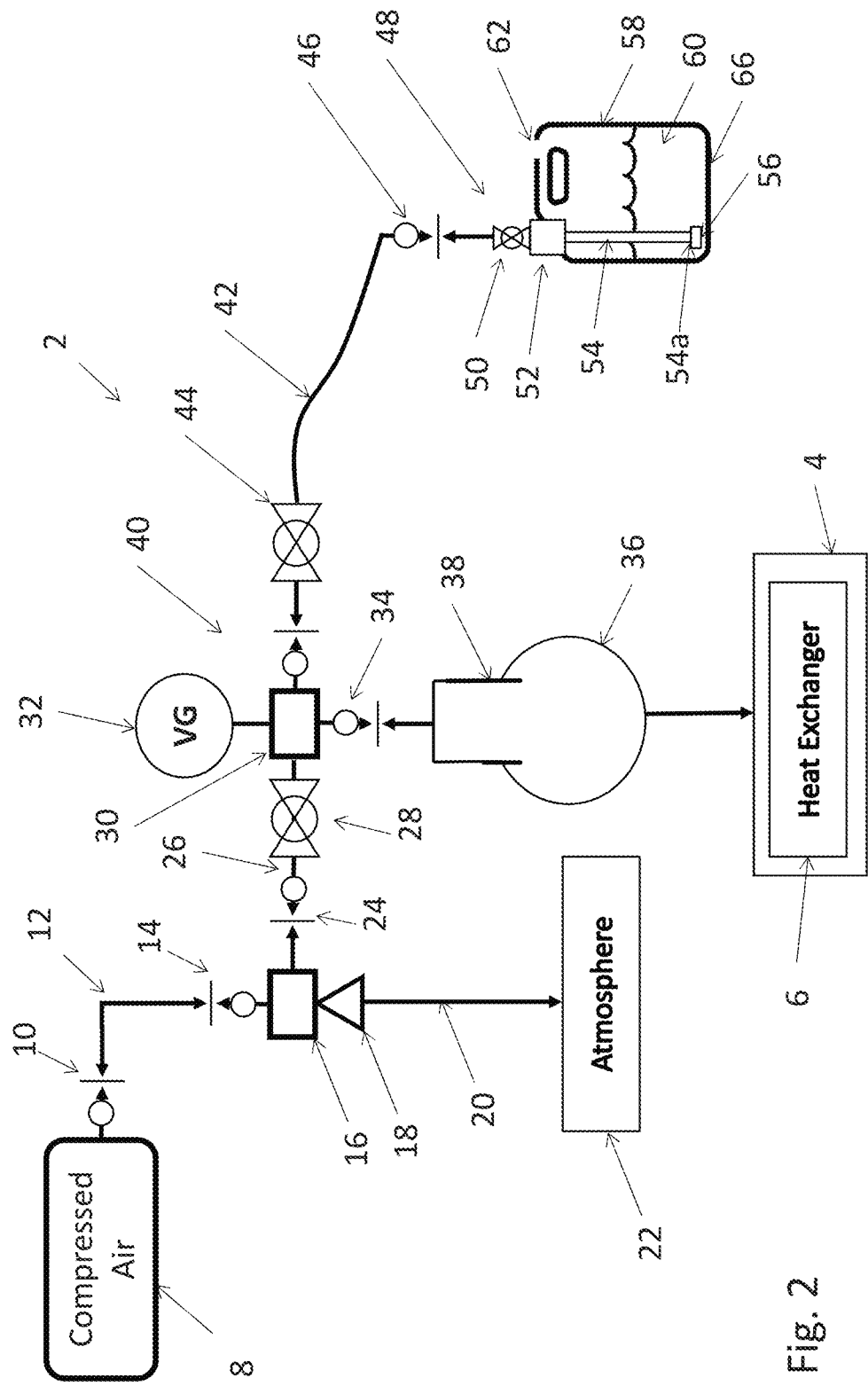
FIG. 2 is a schematic diagram showing a system for vacuum-filling a heat exchanger of the present disclosure.

FIG. 2 is a schematic diagram showing a system 2 for vacuum-filling a heat exchanger 6 (e.g., a portion of a cooling system 4) of the present invention. System 2 includes a compressed air supply 8 (e.g., an air compressor and/or an air tank), a fitting 10 operably coupled to the compressed air supply, an air conduit 12, fitting 14, an air eductor 16 and a vent 18 including a vent hose 20. In embodiments, the vent 18 and vent hose 20 are fluidly coupled with the atmosphere 22 (e.g., the outside air). A fitting 24 is coupled to air eductor 16, and a conduit 26 coupled between the air eductor 16 (i.e., through fitting 24) and a manifold 30. A valve 28 is fluidly coupled to conduit 26. A vacuum gauge 32 is operably coupled to manifold 30 and operable to determine a pressure within system 2 (e.g., at manifold 30). A fitting 34 is coupled to manifold 30 and an expansion reservoir 36 is coupled to the manifold through a threaded adaptor 38. In embodiments, the expansion reservoir 36 is fluidly coupled to the cooling system 4 (e.g., heat exchanger 6 of an internal combustion engine). A fitting 40 is coupled to manifold 30 and a conduit 42 including a valve 44 is coupled to fitting 40. In embodiments, manifold 30 includes a first aperture (e.g., fluidly coupled to valve 28), a second aperture (e.g., fluidly coupled to expansion reservoir 36), and a third aperture (e.g., fluidly coupled to a valve 44).

Still referring to FIG. 2, an end unit 48 includes a valve 50, a standpipe 54 (e.g., a pipe), a suction strainer 56, and a supply bottle cap 52. A supply bottle 58 (e.g., supply volume) may contain coolant (e.g., engine coolant, water, antifreeze, etc.) and a vent hole. In embodiments, end unit 48 is coupled to conduit 42 by a fitting 46. In embodiments, conduit 42 includes valve 44 coupled to a first end and fitting 46 coupled to a second end opposite the first end. In embodiments, fitting 46 is operably coupled to valve 50 and valve 50 extends through an aperture 64 (FIG. 7A) within supply bottle cap 52 and is coupled to the standpipe 54. In embodiments, standpipe 54 extends outwardly from cap 52. In embodiments, valves 44 and 50 are both 90 deg (quarter-turn) ball valves. In embodiments, suction strainer 56 is coupled to a bottom end 54a of standpipe 54. Bottle cap 52 is threadedly engaged to an opening 59 of supply bottle 58 by mating threads (not shown) and a vent hole 62 (e.g., an aperture) is located at or near the top of the supply bottle 58. Standpipe 54 defines a height H1 (FIG. 6B) to position suction strainer 56 at or near a bottom surface 66 of supply bottle 58 when bottle cap 52 is threadedly coupled to supply bottle opening 59. As shown, supply bottle 58 contains a coolant 60 (e.g., engine coolant, water, antifreeze, etc.) which will be drawn into cooling system 4 (e.g., heat exchanger 6) during the operation of system 2 for vacuum-filling the heat exchanger 6 of cooling system 4. Valve 44, conduit 42, fitting 46, valve 50, standpipe 54, suction strainer 56, supply bottle 58, supply bottle cap 52, and vent hole 62 will be shown and described in more detail below.

During operation of system 2 for vacuum-filling a heat exchanger (e.g., heat exchanger 6), a technician (i.e., a user) creates a vacuum in cooling system 4 using a process that is substantially similar to that described above in regard to FIG. 1. That is, compressed air from air supply 8 may flow from air supply 8 and through air eductor 16 with valve 28 open and valve 44 closed to create a vacuum within cooling system 4. As noted earlier, valves 28 and 44 are both closed after the desired pressure (e.g., vacuum) exists within cooling system 4 as indicated on vacuum gauge 32. A desired vacuum may be approximately 30 inches of Mercury (in. Hg) (approximately 762 mm Hg) as indicated on vacuum gauge 32. In embodiments, compressed air from air supply 8 may flow to air eductor 16 and into atmosphere 22 to create a vacuum within cooling system 4 until the pressure within cooling system 4 reaches a predetermined threshold (e.g., 30 in. Hg). Valves 28 and 44 may be closed to retain the vacuum within the cooling system 4.

Subsequent to creating a vacuum on cooling system 4, a leak test on cooling system may be performed by monitoring vacuum gauge 32 to determine if system 2 has proper sealing. In embodiments, a leak may be detected if vacuum gauge 32 does not read a consistent pressure value. In embodiments, a leak may not exist if the vacuum gauge reads a consistent pressure value.

A user may position supply bottle 58 such that it stands upright or nearly upright, whether it be on the floor beside the vehicle on which cooling system is located, on a stand beside the vehicle, or within the engine compartment of the vehicle.

In embodiments, the leak test is optional, and subsequently to creating the vacuum on the cooling system 4, the technician opens (or checks open) valve 50 allowing fluid (i.e., coolant 60) to flow through end unit 48 and conduit 42. A user may then open valve 44, allowing coolant to be drawn into expansion reservoir 36 and into cooling system 4. That is, due to the vacuum on cooling system 4 (e.g., between valve 28 and valve 44), coolant will naturally flow from a higher pressure location (e.g., the supply bottle 58) to the lower pressure location (e.g., cooling system 4) after valves 44 and 50 are opened. In embodiments, coolant may flow along a flow path from supply bottle 58 to cooling system 4 from suction strainer 56, through standpipe 54, valve 50, fitting 46, conduit 42, valve 44, fitting 40, manifold 30, fitting 34, and expansion reservoir 36 and into cooling system 4. As coolant is drawn into cooling system 4, ambient air is drawn into supply bottle 58 through vent hole 62 to maintain the pressure of the interior of supply bottle 58 at or near ambient atmospheric pressure. This described vacuum fill process is typically a preferred process for filling a cooling system 4 (i.e., heat exchanger 6) of an internal combustion engine because it minimizes or prevents air from being trapped in cooling system 4 which can have adverse effects. For example, a volume of air that is trapped in cooling system 4 can result in the internal combustion engine overheating from a lack of proper heat removal.

Figure 3A:
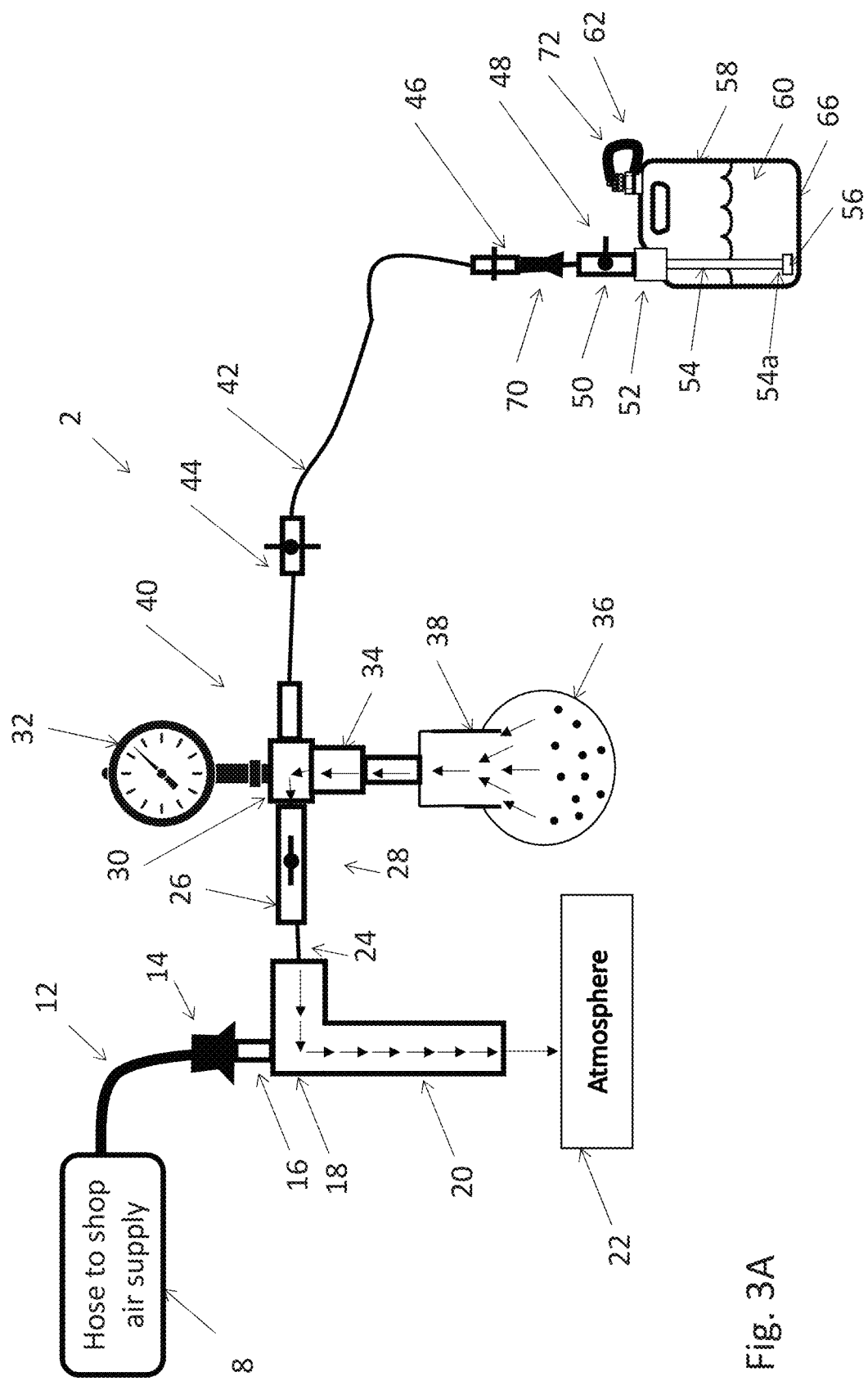
FIG. 3A is a schematic diagram showing the schematic diagram shown in FIG. 2, also identifying the directions of fluid flow in a use case of the present disclosure.
Figure 3B:
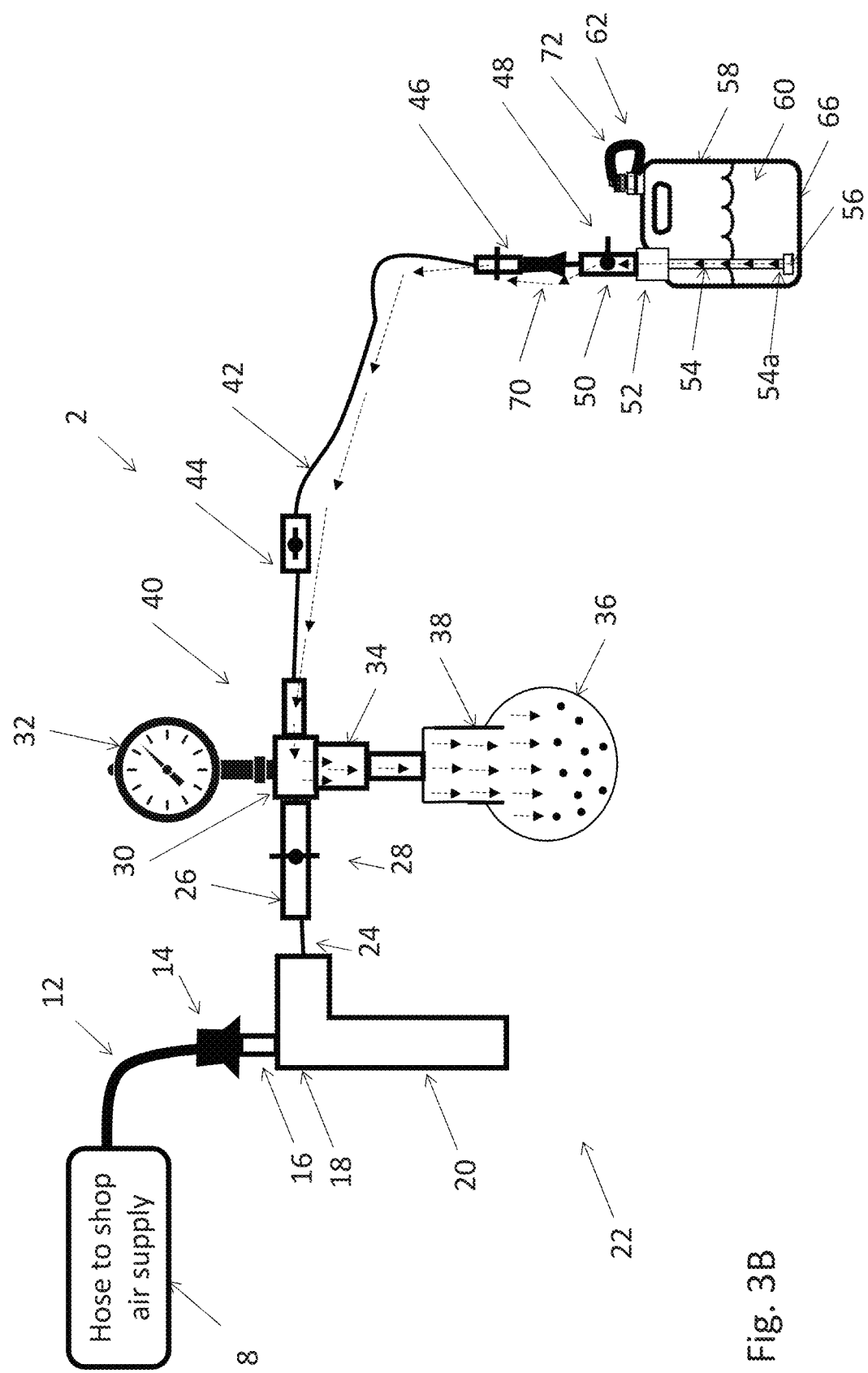
FIG. 3B is a schematic diagram showing the schematic diagram shown in FIG. 2, also identifying the directions of fluid flow in a use case of the present disclosure.

FIG. 3A is a schematic diagram showing the schematic diagram shown in FIG. 2, also identifying the directions of fluid flow when system 2 is creating a vacuum pressure within cooling system 4. The components and features shown in FIG. 3 are substantially similar to those shown and described above in regard to FIG. 2. System 2 may include a barbed fitting 70 threaded ono the inner end of fitting 46. System 2 may also include a vent fitting 72 replaces vent hole 62 on supply bottle 58. In embodiments, supply bottle 58 has a capacity of about 2.5 gal (9.5 liter).

Figure 4:
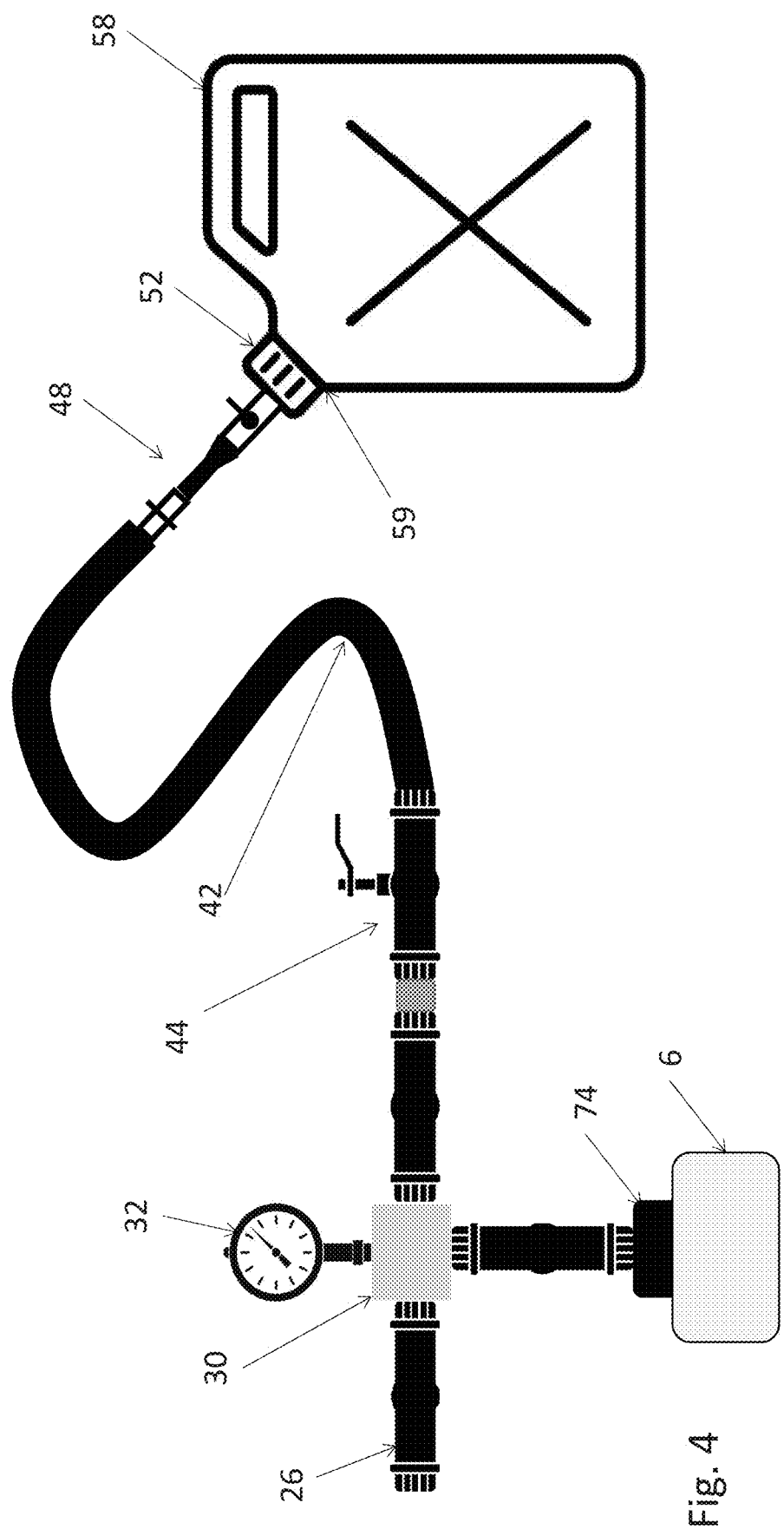
FIG. 4 is an illustration showing the device for vacuum-filling a heat exchanger attached to a cooling system of an internal combustion engine.

FIG. 4 is an illustration showing the device for vacuum-filling a heat exchanger attached to a cooling system of an internal combustion engine. The components shown in the illustration of FIG. 4 depict the relative shapes and sizes of those shown above in FIG. 2. Threaded plug adapter 74 has outer threads is shown engaged with inner threads on expansion reservoir. Threaded plug adapter 74 (e.g., a cap) may be one of many caps which may be utilized with system 2 for attaching to cooling system 2. In embodiments, conduit 42 is a clear flexible plastic having an outer diameter (OD) of 0.384 inches (9.75 millimeters), an inner diameter (ID) of 0.274 inches (6.26 millimeters), and a length of about 36 inches (91 centimeters). In embodiments, conduit 42 has an outer diameter of approximately 0.3-0.5 inches, an inner diameter of 0.2-0.4 inches, and a length between 10-100 inches. In other embodiments, the conduit 42 may have different dimensions (e.g., different length, ID, or OD). The first end of conduit 42 includes valve 44 which is operably coupled to manifold 30. The second end of conduit 42 is operably coupled to a first end of fitting 46 via the threaded barb fitting 70. In embodiments, the second end of fitting 46 is threaded onto valve 50, and a threaded barb fitting is threaded onto the upstream end of valve 50. In embodiments, fitting 46 is the type that is commonly used on a pressure washer discharge hose, and threaded barb fittings (e.g., threaded barb fittings 70) are ¼ in. (6.35 mm) brass hose barb fittings. The configuration is not limited to the components shown. For example, any type and/or size of valves can be used, and any type and/or size of conduit can be used. Further, any size and type of supply bottle cap 52 can be used, with the expectation that it is configured to be threadedly attached to an associated supply bottle 58. Moreover, any size, shape, and/or capacity of supply bottle can be used.

Figure 5B:
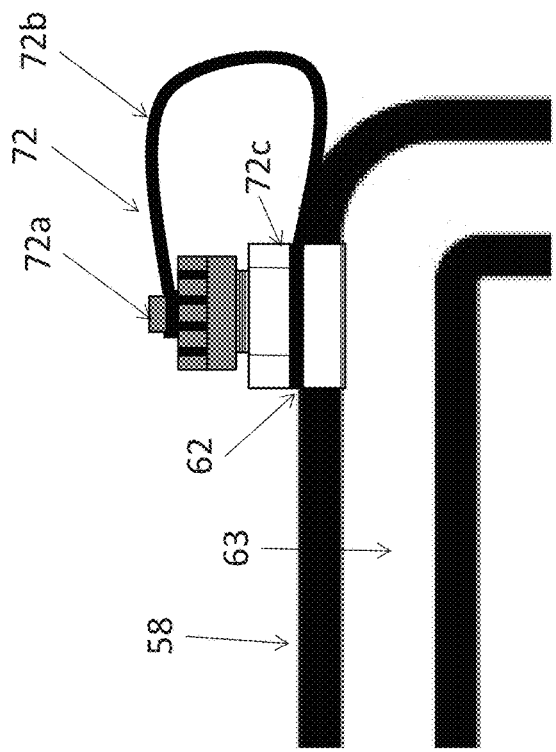
FIG. 5B shows an alternative embodiment of the makeup air inlet port on the supply reservoir shown in FIG. 5A.
Figure 5A:
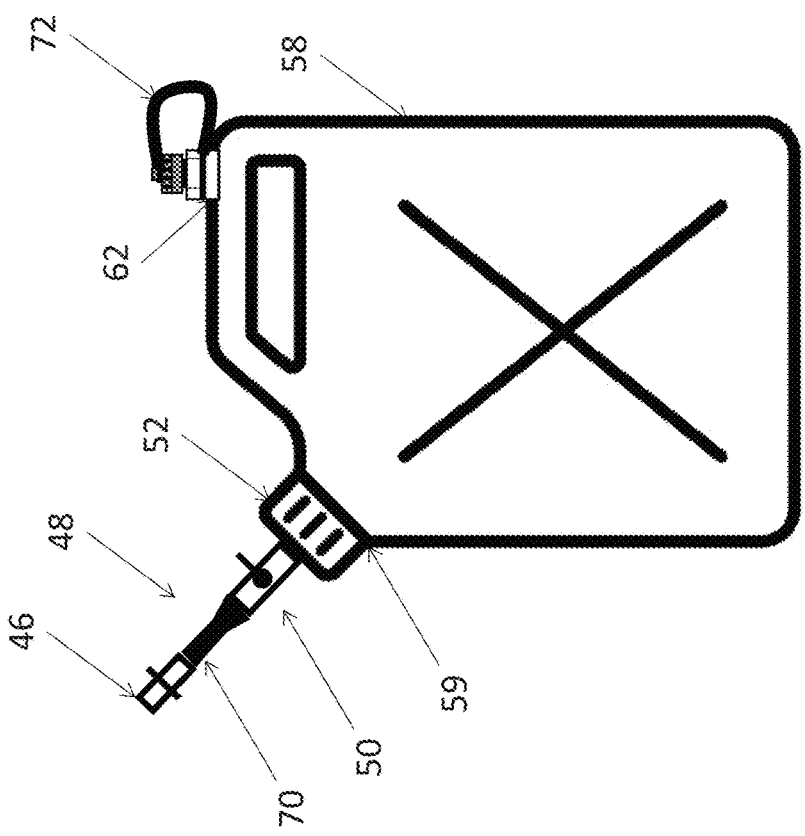
FIG. 5A shows the standpipe assembly and supply reservoir of the device for vacuum-filling a heat exchanger shown in FIG. 4.

FIG. 5A shows the standpipe assembly including valve 50 and a portion of fitting 46. In the embodiment, vent hole 62 is located in a region on a handle 63 of supply bottle 58. In embodiments, vent hole 62 may be located anywhere in the upper half of supply bottle 58. In embodiments, vent hole 62 may be located anywhere in the upper quarter of supply bottle 58. Vent hole 62 may have a diameter from about ¹⁄₃₂ inch (0.8 mm) to ¼ inch (6.4 mm). In embodiments, other vent hole sizes may be used. In embodiments, more than one vent hole can be used.

FIG. 5B shows the detail of vent fitting 72 (breather valve). As shown, vent fitting has a threaded removable cap 72*a* that is supported by a retainer strap 72*b* when threaded removable cap is removed from a vent fitting base 72*c*. In embodiments, vent fitting 72 is a ¼-inch size breather valve and is installed in a ¼-inch (6.4 mm) aperture (e.g., opening 62) in supply bottle. Retainer strap 72*b* helps prevent the loss of threaded removable cap. Vent fitting 72 allows coolant stored within bottle 58 to move around and be retained within supply bottle 58 during transport, storage, or if bottle 58 falls or is placed on its side. Vent fitting 72 can be installed anywhere in the upper region of supply bottle 58 and can be constructed of any material, with nonlimiting examples being brass, aluminum, steel, stainless steel, other metals or alloys thereof, plastic, or a composite material.

In embodiments, supply bottle 58 may be a 2.5 gallon (9.5 liter) F-style plastic bottle (commonly referred to as a "2.5 gal CSBD F-style bottle", with CSBD being the name of the manufacturer. Supply bottle 58 may be made of translucent High-Density Polyethylene (HDPE), which has high strength, durability, has light weight characteristics, and in embodiments, has translucent characteristics to allow a user to see a fluid level from the outside. In other embodiments, supply bottle 58 can have any capacity that can be considered suitable for the size cooling system being refilled, and the volume of coolant that must be used to refill cooling system. If supply bottle 58 has a relatively large capacity it can be referred to as a supply tank. A typical range of sizes for supply bottle 58 is from about 1 pint (0.47 liter) to 50 gallons (189 liters) but can be smaller or larger than this in some embodiments. In other embodiments, supply bottle 58 can be clear, opaque, or formed of a material with properties with any range of light transmission there between, and can be made of any type of plastic, metal, composite, or any other material that can be configured to contain fluid. In other embodiments, system 2 may be manufactured such that the supply bottle 58 or tank is integrally coupled with the system 2, forming one unit. In embodiments, the supply bottle 58 or tank may contain ventilating apertures, which may be selectively open or closed.

FIG. 6A shows the standpipe assembly 54 from the supply bottle 58 shown in FIG. 4. FIG. 6B shows the rigid pipe of the standpipe assembly shown in FIG. 6A. Standpipe 54 has a length that is chosen to place suction strainer 56 touching or within the vicinity of the bottom 66 of supply bottle 58. In the illustrated embodiment (i.e., using a 2.5 gal CSBD F-style bottle), standpipe 54 is made of Cross-Linked Polyethylene (PEX) and is referred to as "½-inch PEX", having an outer diameter (OD) of about 0.627 inch (1.6 cm), an inner diameter (ID) of about 0.47 inch (1.2 cm), and a length of about 13 inches long (33 cm). Standpipe 54 may be formed of a fairly rigid material that may be threaded. In embodiments, suction strainer 56 may be made of brass (will be shown and described later in FIGS. 8A-8B). In some embodiments, standpipe 54 can have any outer diameter ranging from about ⅛ inch (3.2 mm) to 1 inch (2.5 cm) with a corresponding inner diameter. Standpipe 54 may have a length ranging from about 2 inch (5 cm) to about 10 feet (3 m). In embodiments, standpipe 54 may have different dimensions including a different OD, ID, and/or length which can be outside of these ranges. In other embodiments, standpipe can be made of any material with nonlimiting examples being Polyvinyl Chloride (PVC), HDPE, or other plastics, brass, copper, or other metals, or composite materials. In embodiments, standpipe 54 may be used within supply bottle 58 without the suction strainer 56 at the bottom 66 of supply bottle 58. In these embodiments, standpipe 54 can be configured to stop a distance D1 from the bottom 66 of supply bottle 58. In other configurations, the bottom end 54*a* of standpipe 54 may be cut at an angle or any irregular shape that allows fluid flow into standpipe 54 when any part of standpipe 54 contacts the bottom 66 of supply bottle 58.

Referring again to FIG. 6A, standpipe assembly 54 includes a ¼ turn ball valve (e.g., valve 50 as shown in FIG. 2) that is connected to the outer end of fitting 46. An upper portion of standpipe assembly 54 will be shown and described later in FIGS. 7A-7E.

Figure 7C:
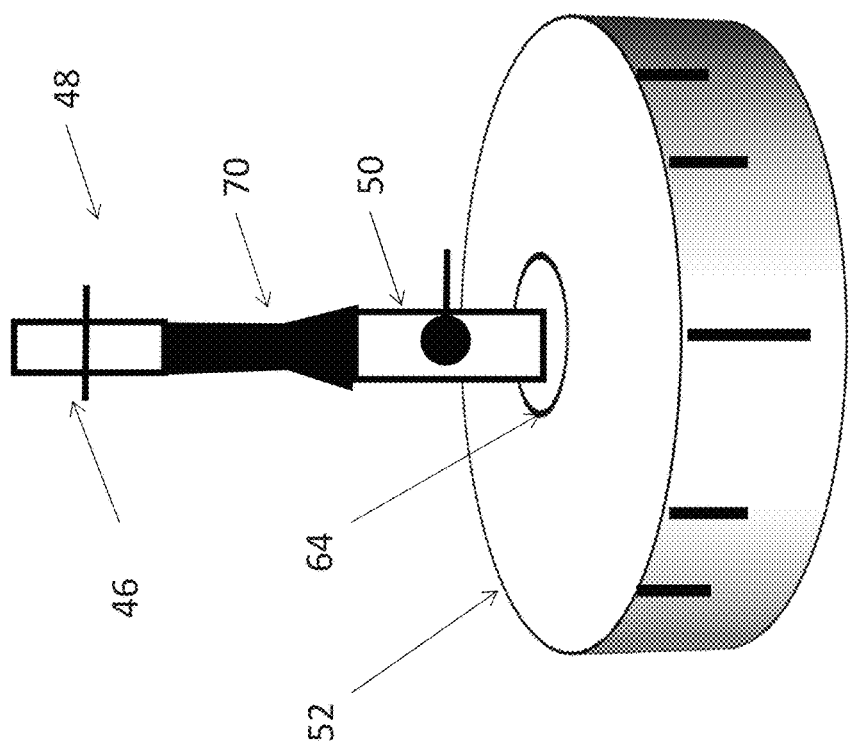
FIG. 7C shows the cap, inlet cutout valve, and female portion of the quick connect fitting of the standpipe assembly shown in FIG. 4.
Figure 7B:
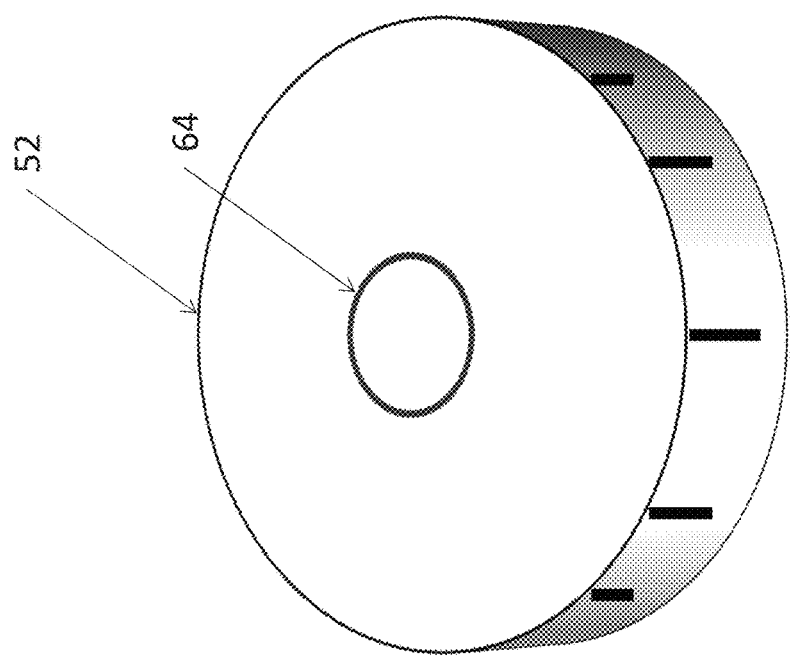
FIG. 7B shows the cap portion of the standpipe assembly shown in FIG. 4.
Figure 7E:
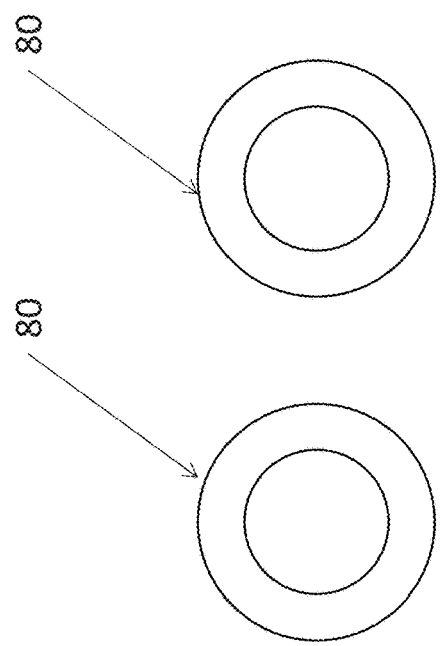
FIG. 7E shows two washers on standpipe assembly shown in FIG. 4.
Figure 7D:
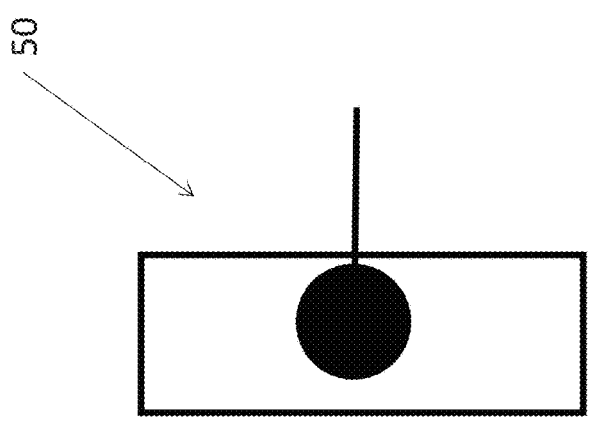
FIG. 7D shows the inlet cutout valve of the standpipe assembly shown in FIG. 4.

FIG. 7A shows an underside view of the cap 52 and standpipe assembly 54 shown in FIG. 4. FIG. 7B shows the cap portion 52 of the standpipe assembly 54 shown in FIG. 4. FIG. 7C shows the cap 52, valve 50, and second portion of the fitting 46 of the standpipe assembly 54. In the illustrated embodiment, a nylon washer 80 is used against the top of the cap 52. FIG. 7D shows the valve 50 of the standpipe assembly 54. In embodiments, valve 50 is an inlet cutout valve 50. FIG. 7E shows two washers 80, one or both of which may be used on standpipe assembly shown in FIG. 4.

Referring now to FIGS. 7A-7E, standpipe 54 passes through aperture 64 in cap 52 (FIGS. 7A-7B) and is threadedly attached to internal structure of inlet cutout valve 50 (FIGS. 7C-7D). In embodiments, the upper end of standpipe 54 is threaded with ½-inch pipe thread (½×20 NF tap) that will allow it to be threaded into the bottom of inlet cutout valve 50. In embodiments, thread tape or pipe compound may be utilized to secure standpipe 54 with valve 50. Aperture 64 (i.e., port or hole) within cap 52 has a diameter of about 0.627 inch (1.6 cm). In embodiments, cap 52 may have a diameter that is selected to accommodate the outer diameter of standpipe 54. Inlet cutout valve 50 may be coupled to cap 52 by threadedly engaging with a perimeter of aperture 64 on cap 52. In embodiments, external threads on inlet cutout valve 50 correspond to the perimeter of aperture 64 (e.g., threads on aperture 64). In some embodiments, threads on the perimeter of aperture 64 on cap 52 can be created with an appropriately sized thread-cutting tap prior to threadedly attaching inlet cutout valve 50 to cap 52. In other various embodiments, aperture 64 in cap 52 can have a diameter that ranges from about ⅛ inch (3 mm) to 6 inches (15 cm). In some embodiments, a barbed fitting 70 could be used to attach standpipe 54 to valve 50.

Referring again to FIG. 7C, washer 80 is placed between a bottom shoulder of inlet cutout valve 50 and the top of cap 52 (not shown). In embodiments, washers 80 can be made of any material, with other methods being used for attaching standpipe 54 to cap 52. In other embodiments, standpipe 54 can be held in place at the bottom of cap 52 with a thread nut (not shown). In some embodiments, one or both washers 80 can be eliminated. In yet other embodiments, standpipe 54 can be adhesively attached to cap 52, or standpipe 54 and cap 52 can be molded or manufactured as a single assembly. Nonlimiting examples of manufacturing include molding, extruding, additive manufacturing, and hybrid additive manufacturing.

Figure 7F:
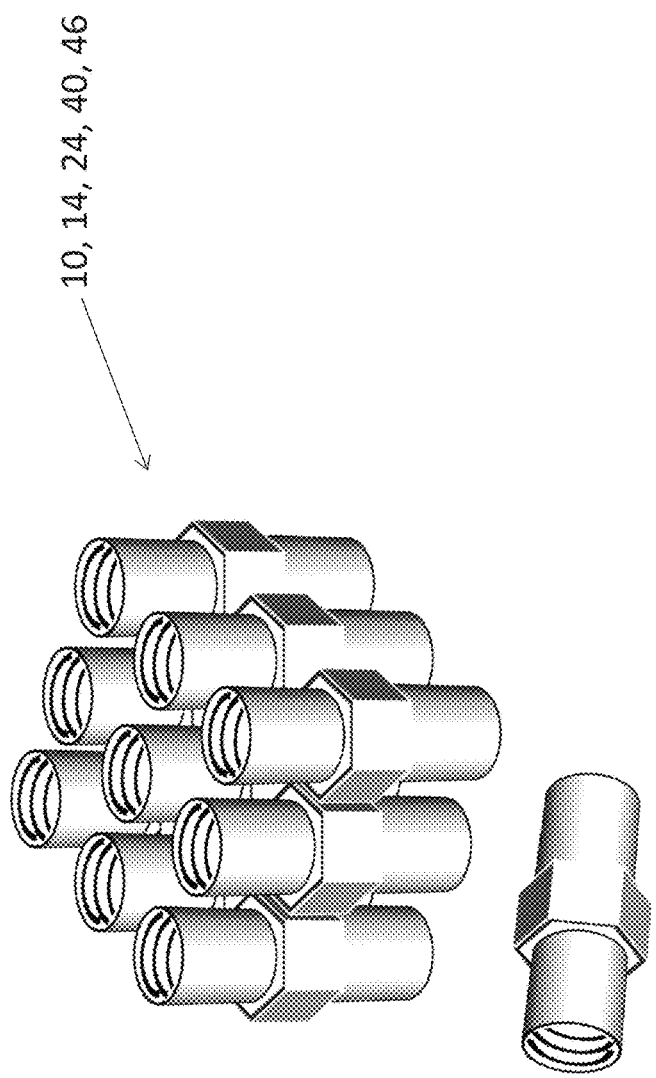
FIG. 7F shows several ¼-inch female to ¼-inch female NPT fittings.
Figure 7G:
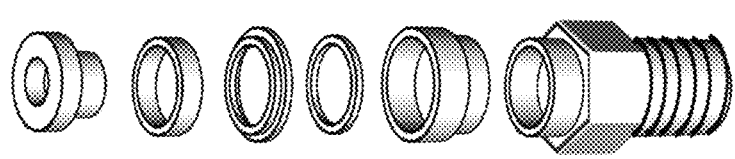
FIG. 7G shows an exploded view of a ½-inch push-to-connect quick connect fitting view showing the internal structure.
Figure 7I:
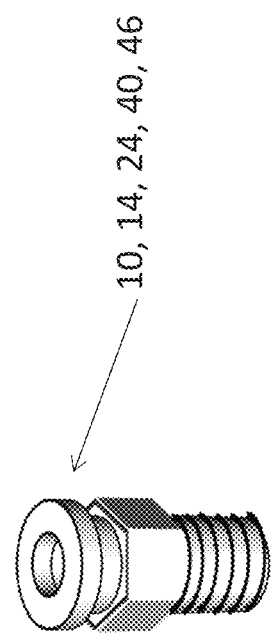
FIG. 7I shows perspective views of ½ inch push-to-connect quick connect fitting with ¼-inch male NPT on its opposite end.

FIG. 7F shows several ¼-inch female to ¼-inch female NPT fittings. FIG. 7G shows an exploded view of a ½-inch push-to-connect quick connect fitting showing the internal structure. FIG. 7H shows two exemplary push-to-connect quick connect fittings of different sizes, each connected to a respective standpipe. In embodiments, each fitting 10, 14, 24, 40, 46 is a quick connect fitting. FIG. 7I shows perspective views of ½ inch push-to-connect quick connect fitting with ¼-inch male NPT on its opposite end. FIGS. 7F-7I will be described together, together describing various alternative embodiments of connecting inlet cutout valve 50 to standpipe 54. ¼-inch female to ¼-inch female NPT fitting shown in FIG. 7F can be used to threadedly couple inlet cutout valve 50 to ½-inch push-to-connect quick connect fitting.

In an alternative embodiment, a method of attaching the standpipe 54 to the cap may be accomplished by using a push-to-connect quick connect fitting (e.g., one of fittings 10, 14, 24, 40, 46) as shown in FIGS. 7G-7I that grips standpipe 54 at a first end of the fitting, and operably coupling (e.g., by threads) the other end of the fitting to inlet cutout valve 50. In this embodiment, standpipe 54 attaches to ½-inch push-to-connect quick connect fitting by pushing upper end of standpipe 54 into ½-inch push-to-connect quick connect fitting, thereby locking standpipe 54 in place while forming a leak-proof or leak-resistant seal. This configuration provides a strong and durable end unit 48 with a long life (e.g., little to no maintenance required)

In other embodiments, the outer diameter of standpipe 54 and the corresponding fitting may have a size ranging from a ⅛-inch outer diameter to a 1-inch outer diameter. In embodiments, the outer diameter of standpipe 54 and the corresponding fitting have a size greater than 1-inch. In various embodiments standpipe 54 can be made of any rigid material with nonlimiting examples including PVC, other plastic, and any metal or metal alloy capable of working with the push-to-connect quick connect fitting.

Figure 8A:
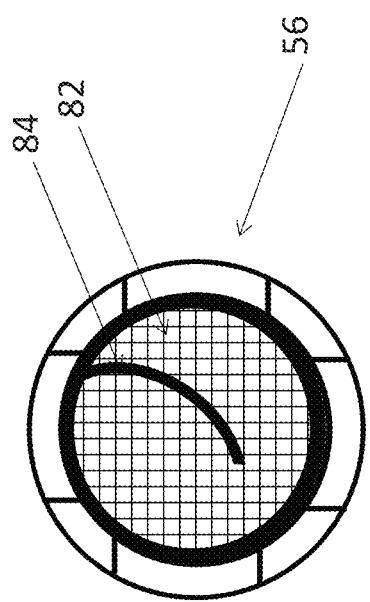
FIG. 8A is a bottom view of the standpipe strainer inlet assembly shown in FIG. 6A.
Figure 8B:
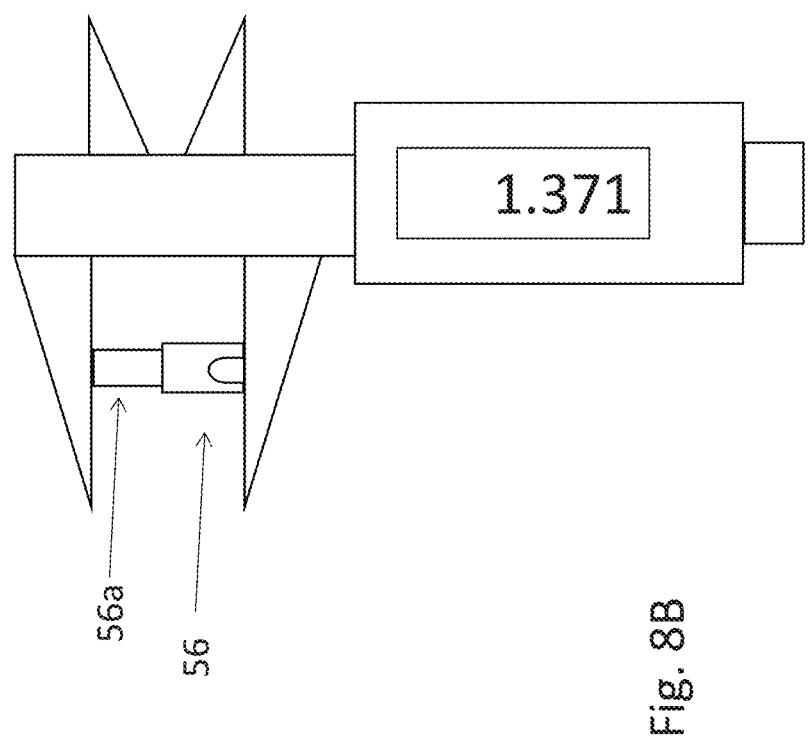
FIG. 8B is a side view of the standpipe strainer inlet assembly shown in FIG. 6A, positioned within an outside caliper measuring tool.

FIG. 8A is a bottom view of the standpipe strainer 56 inlet assembly shown in FIG. 6A. FIG. 8B is a side view of the standpipe strainer inlet assembly 56 shown in FIG. 6A, positioned within an outside caliper measuring tool. Strainer inlet assembly 56 can also be called a strainer inlet or a suction strainer, having a wire mesh strainer 82 secured by a spring retainer 84 that filters particles and sediment from entering standpipe 54 during operation. Strainer inlet 54 has an outer diameter of about 0.705 inch (1.79 cm) and an overall length of about 1.37 inch (3.48 cm). The upper end 56a of strainer inlet assembly 56 is a barbed fitting for attachment to standpipe 54 (as shown in FIG. 6A). This also adds to the durability of standpipe assembly 54 and helps assist a secure attachment between the strainer 56 and the standpipe 54. The upper end 56a (e.g., barbed end) has an OD of 0.404 inch (1.03 cm) and is wrapped by polytetrafluoroethylene (PTFE)) thread seal tape to further assure a secure attachment of strainer inlet 56 to standpipe 54 thereby making the fitting snug inside the PEX pipe. In some embodiments, other materials can be used to secure the upper end 56a (e.g., barbed end) within standpipe 54, with nonlimiting examples including other types of joint sealing tape, compound, or adhesive. In embodiments, no additional scaling material is used on the upper end 56a (e.g., barbed end). In any of these embodiments, standpipe strainer 56 can be made of any material including brass, copper, aluminum, or other metals or alloys thereof, or of plastic, resin, or a composite material. In other embodiments, standpipe strainer 56 can include other types of screens, grates, or filter elements, and can be made from any of the aforementioned materials. In embodiments, standpipe strainer 56 is operably coupled to system 2 within an interior of the standpipe 54. In embodiments, standpipe strainer 56 is operably coupled to system 2 within an interior of the conduit 42.

Referring again to FIGS. 8A-8B, four flow channels 56c (e.g., flow arches) are located on the bottom of strainer inlet assembly 56, having the purpose of allowing flow into strainer inlet assembly 56 in the event that strainer inlet assembly 56 contacts or nearly contacts the bottom 66 of supply bottle 58. In the illustrated embodiment, each arch 56c has a width of about 0.3 inch (7.6 mm) and a center height of about 0.8 inch (20 mm). In other embodiments, any number of flow channels can be used, each having any shape and any dimension that can be accommodated by strainer inlet assembly 56. In some embodiments, one or more apertures of any shape or size can be located in the side of strainer inlet assembly 56 (e.g., not along its bottom face), thereby allowing the bottom face of strainer inlet assembly 56 to contact or nearly contact the bottom 66 of supply bottle 58. In yet other embodiments, standpipe strainer 56 can be provided without a strainer or filter element. In these embodiments, standpipe strainer can be referred to as a standpipe inlet component or a standpipe foot. In some embodiments, standpipe can be provided without standpipe strainer or standpipe inlet component, instead having a bare end that functions as the inlet port to standpipe 54. In these embodiments, the exposed standpipe end can optionally be cut at an angle, with a notch, or with some other pattern such that the cut cross-section it is not relatively flat and normal to the axis of standpipe. This can help prevent restricting coolant flow into standpipe during operation by contacting or nearly contacting the bottom 66 of supply bottle 58.

Figure 9A:
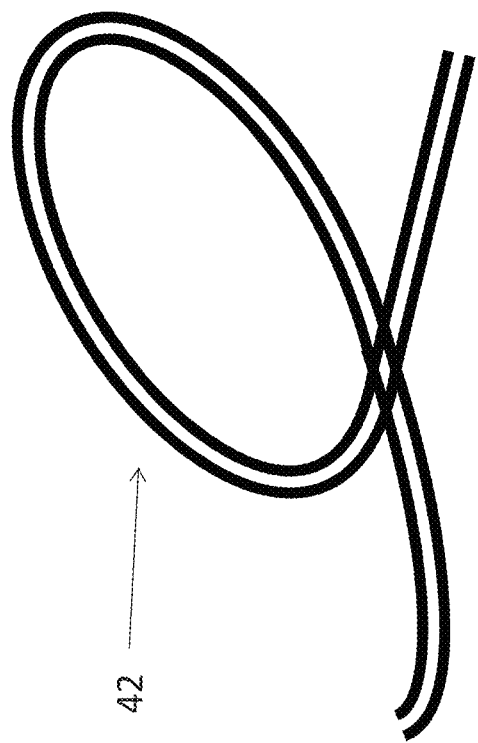
FIG. 9A shows the supply reservoir transfer tube shown in FIG. 4.
Figure 9B:
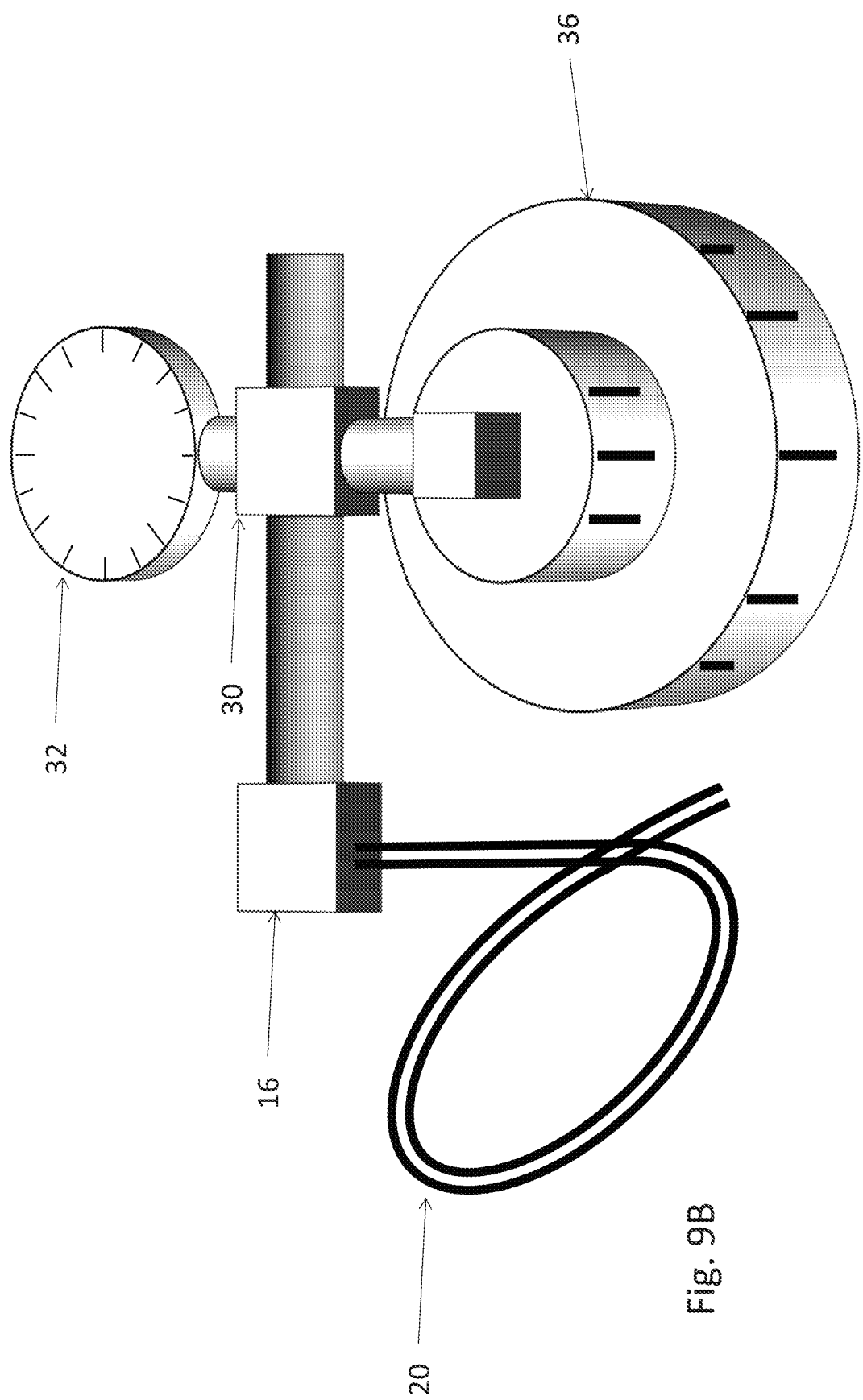
FIG. 9B shows the air eductor air eductor, manifold, and coolant expansion reservoir adapter shown in FIG. 4.
Figure 9C:
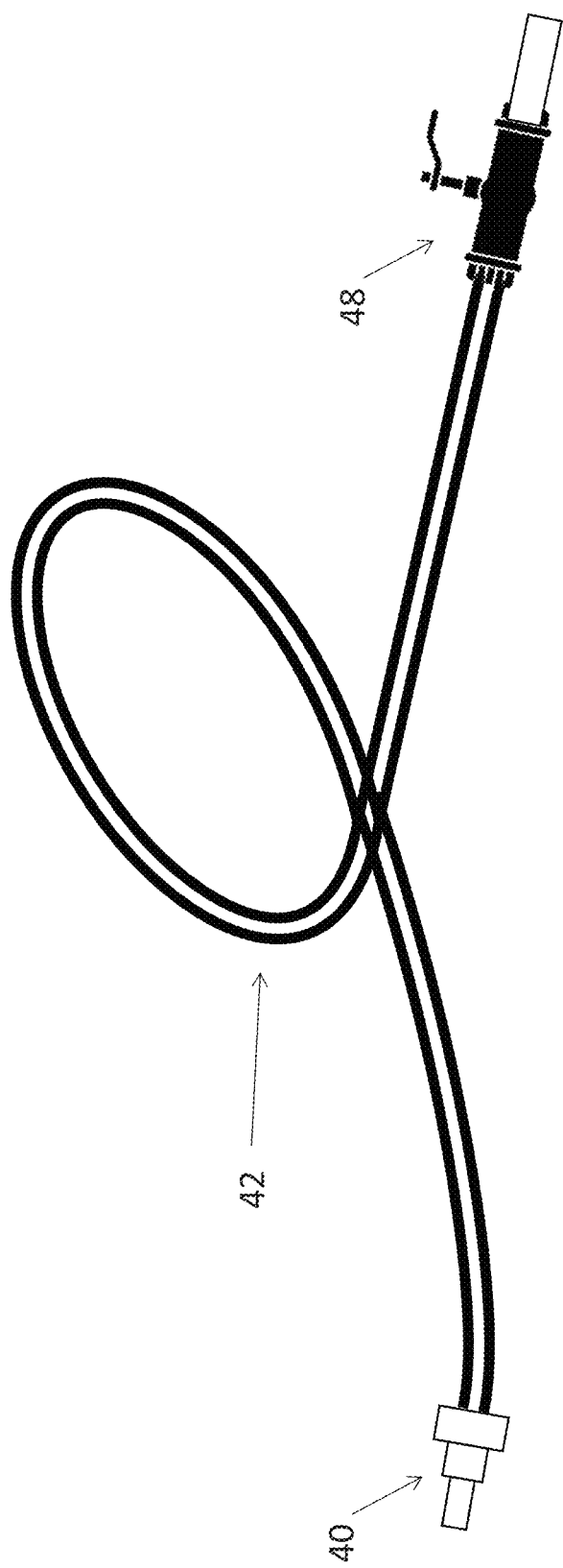
FIG. 9C is a second view of the supply reservoir transfer tube shown in FIG. 9A.
Figure 9D:
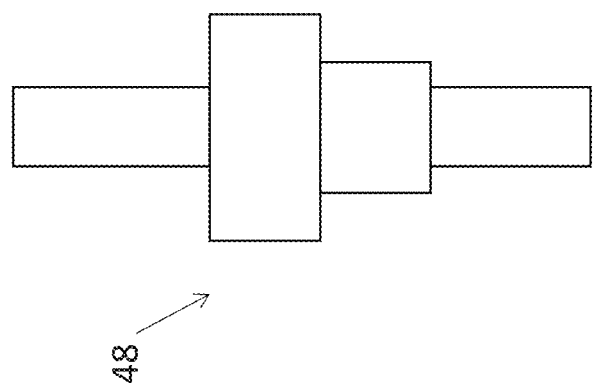
FIG. 9D shows the supply reservoir transfer tube connector and male portion of the quick connect fitting of the supply reservoir transfer tube shown in FIG. 9A.

FIGS. 9A and 9C show conduit 42 that was shown and described above in regard to FIGS. 2 and 4. Conduit 42 can also be referred to as supply reservoir transfer tube or a suction tube. FIG. 9B shows air eductor 16, manifold 30, and coolant expansion reservoir 36 adapter shown and discussed above in regard to in FIG. 4. Manifold 30 can be referred to as a four-way manifold, and it is known to those skilled in the internal combustion cooling system arts. FIG. 9D shows conduit 42 barbed end attached to the inner end of quick connect fitting Q6.

Those who are skilled in the internal combustion cooling system arts prefer drawing a vacuum on a cooling system by using an air eductor according to the above-described process as opposed to using a vacuum pump or other type of vacuum source.

Various embodiments of systems, devices, and methods have been described herein, with several non-exhaustive examples being provided. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations, and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. For purposes of interpreting the claims, it is expressly intended that the provisions of 35 U.S.C. § 112(f) are not to be invoked unless the specific terms "means for" or "step for" are recited in a claim.

The invention claimed is:

1. A system for vacuum filling a cooling assembly, the system comprising:
    a manifold comprising a first aperture, a second aperture, and a third aperture;
    an eductor fluidly coupled to the first aperture;
    a first valve fluidly coupled between the eductor and the first aperture;
    an expansion reservoir sealingly coupled to the second aperture;
    an end unit fluidly coupled to the third aperture, the end unit comprising:
        a conduit fluidly coupled with the third aperture;
        a second valve fluidly coupled to the conduit;
        a cap for sealingly coupling with a supply volume; and
        a pipe coupled to the cap and fluidly coupled with the conduit, the pipe sealingly coupled to the cap and extending outwardly from the cap.

2. The system of claim 1, wherein the end unit further comprises a strainer coupled to the pipe, wherein the pipe is coupled to the cap at a pipe first end and the strainer is coupled to the pipe at a pipe second end.

3. The system of claim 2, wherein the strainer includes a first portion and a second portion, and the first portion defines a plurality of channels.

4. The system of claim 3, wherein the second portion is threadedly engaged with the pipe second end.

5. The system of claim 1, further comprising a third valve fluidly coupled to the conduit, the third valve positioned fluidly intermediate the end unit and the manifold.

6. The system of claim 4, further comprising a pressure gauge coupled to the manifold.

7. The system of claim 5, further comprising a plurality of quick connectors, the plurality of quick connectors including a first quick connector coupled between the end unit and the third valve.

8. A method of vacuum filling a cooling assembly with a system comprising a manifold comprising a first aperture, a second aperture, and a third aperture, an end unit fluidly coupled to the third aperture, a first valve fluidly coupled with the first aperture, a second valve fluidly coupled between the third aperture and the end unit, the end unit comprising a third valve, the method comprising:
    coupling the first aperture to a compressed air supply;
    fluidly coupling the second aperture to a cooling assembly;
    sealingly coupling the end unit to a coolant supply;
    opening the first valve to allow an air stream from the compressed air supply to flow through an air eductor, the pressure on the cooling assembly decreasing in response to the air flow flowing through the air eductor;
    closing the first valve subsequent to the pressure on the cooling assembly reaching a first predetermined threshold;
    opening each of the second valve and the third valve to allow coolant from the coolant supply to flow into the cooling assembly.

9. The method of claim 8, wherein the end unit includes a pipe operable to extend to a position adjacent a bottom surface of the coolant supply.

10. The method of claim 9, further comprising a strainer coupled to the bottom of the pipe.

11. The method of claim 10, wherein the first predetermined threshold is 30 inches of Mercury.

12. The method of claim 10, the system further comprising a plurality of quick connectors, the plurality of quick connectors including a first quick connector coupled between the end unit and the second valve.

13. The method of claim 12, wherein the plurality of quick connectors includes a second quick connector coupled between the first aperture and the air eductor.

14. The method of claim 13, further comprising an expansion reservoir fluidly coupled with the second aperture.

15. The method of claim 14, wherein the expansion reservoir is fluidly coupled between the second aperture and the cooling assembly.

* * * * *